No. 757,258. Patented April 12, 1904.

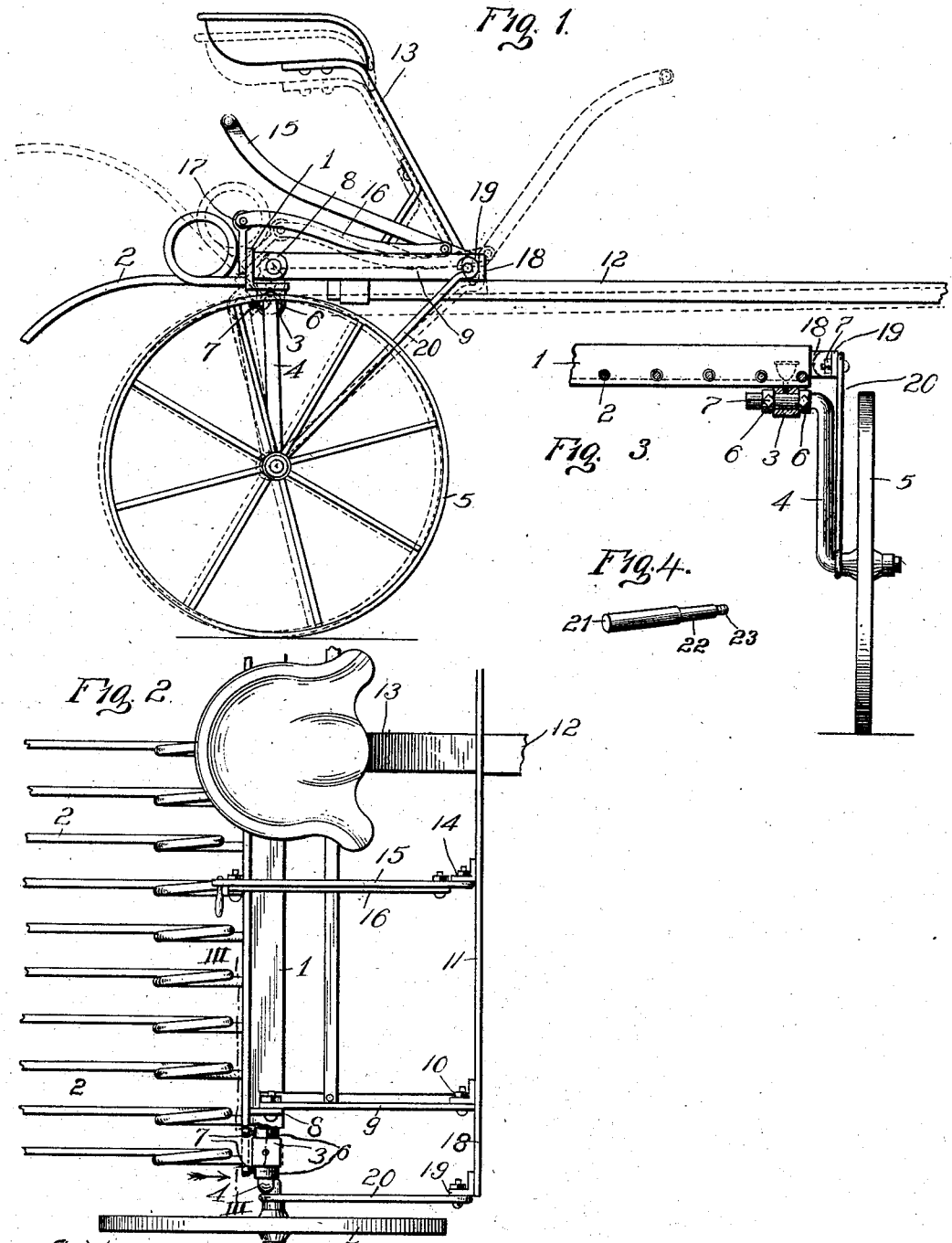

UNITED STATES PATENT OFFICE.

LUTHER BROWN, OF PLATTE COUNTY, MISSOURI.

HORSE HAY-RAKE.

SPECIFICATION forming part of Letters Patent No. 757,258, dated April 12, 1904.

Application filed September 24, 1903. Serial No. 174,384. (No model.)

*To all whom it may concern:*

Be it known that I, LUTHER BROWN, a citizen of the United States, residing in the county of Platte and State of Missouri, have invented certain new and useful Improvements in Horse Hay-Rakes, of which the following is a specification.

My invention relates to hay-rakes of that type provided with low wheels in order that the ground close to fruit-trees may be properly raked without injury to the trees or the fruit thereon, my special object being to provide a horse hay-rake in which the rake-teeth-carrying frame turns on the shaft, as distinguished from the structure in which the shaft turned in the wheel-carrying crank-arms, as embodied in my allowed application for patent on horse hay-rake filed May 7, 1903, Serial No. 155,967, and allowed July 3, 1903.

A further object is to produce a horse hay-rake of the character named which is of simple, strong, durable, and comparatively cheap construction.

With these objects in view the invention consists in certain novel and peculiar features of construction and organization, as hereinafter described and claimed; and in order that it may be fully understood reference is to be had to the accompanying drawings, in which—

Figure 1 is a side view of a horse hay-rake embodying my invention. Fig. 2 is a top plan view of a portion of the same. Fig. 3 is a section taken on the line III III of Fig. 2, but with the bearing shown in section. Fig. 4 is a detail perspective view of one of the stub-axles adapted for use when desiring to transform the machine into a high-wheel rake.

Referring now to the drawings in detail, 1 designates a transverse angle-bar equipped with the usual rearwardly-projecting teeth 2 and provided near each end with depending bearings 3.

As shown clearly in Fig. 3, short crank-axles 4, equipped with the usual carrying-wheels 5 at their lower ends, have their upper ends journaled in the contiguous bearings 3 and provided with collars 6, engaging opposite sides of the bearings to prevent endwise movement of the shafts, said collars being se-cured at the required point of adjustment on the shafts by the set-screws 7, as shown.

8 designates lugs projecting rigidly from the angle-bar, and pivotally connected to the same are the rear ends of bars 9, secured, as at 10 or otherwise, to the transverse bar 11, said bar overlying and secured in the usual manner to the tongue 12 and forming a support for the seat-supporting spring 13. The frame thus constituted and pivoted to the rake-teeth-carrying bar is of common and well-known construction, and pivoted to the front bar of said frame, as at 14, is the dumping-lever 15, connected pivotally by link 16 to the rigid arm 17, projecting upwardly from the rake-teeth-carrying bar. This frame is of the usual construction; but, like that of the aforesaid application, it is provided with lateral extensions 18, provided with rigid brackets 19, to which are pivotally connected inclined braces 20, said braces inclining downward and rearward and pivoted at their lower ends on the lower portions of the cranks between their upright portions and the hubs of the wheels.

The full lines in Fig. 1 show the machine as adapted for raking the ground and in dotted lines as engaged in releasing the hay previously gathered. It will be noticed that as the dumping-lever is thrown in the usual manner from the position shown in full to the position shown in dotted lines the wheels are caused to move slightly backward, the bar 1 in rotating forwardly incidentally swinging the arched portion of the crank-axle rearwardly. In this action the entire superstructure of the machine is slightly lowered, as indicated, and as is customary in this class of machines the weight of the parts, supplemented by that of the operator, assists in raising the rake-teeth to dumping position. To restore the parts to their original positions, the dumping-lever is grasped and thrown rearwardly in the customary manner.

It will be apparent that the structure described is convertible from a high to a low wheel rake by removing the crank-axle and substituting the usual straight axle and mounting thereon the usual high wheels.

If it is desired to use the machine in connection with high wheels instead of with low wheels, the latter and the crank-axles are removed and short stub-axles 21 of the type shown in Fig. 4 are journaled in bearings 3 and secured therein by collars 6 and set-screws 7, the high wheels (not shown) being journaled upon the reduced portions 22 of such axles and retained thereon in the usual manner by nuts (not shown) engaging the threaded ends 23 of said stub-axles.

From the above description it will be apparent that I have produced a horse hay-rake embodying the features of advantage enumerated as desirable in the statement of invention and which obviously may be modified in minor particulars without departing from its essential spirit and scope.

If it is desired to use either of the types of machines described as a high-wheel machine, the crank-axle thereof can be removed and short stub-axles 21 of the type shown in Fig. 5 journaled in bearings 3 and secured therein by the collars 6 and set-screws 7, the wheel being journaled upon the reduced portions 22 of such axles and retained thereon in the usual manner by nuts (not shown) engaging the threaded ends 23 of the axles.

Having thus described the invention, what I claim as new, and desire to secure by Letters Patent, is—

1. A hay-rake, comprising a tongue and seat-carrying frame, a transverse bar equipped with rake-teeth, and pivoted to said frame and adapted to turn about a horizontal axis to raise or lower the teeth, bearings secured to said bar, horizontal axles journaled in said bearings provided with depending crank-arms having outturned ends, wheels journaled on said crank-arms below the axes of said axles, an inclined brace pivotally connected to said frame at their front ends and pivotally connected at their rear ends to said crank-arms below the axes thereof, and means for rotating said teeth-carrying bar and for securing it in position with its teeth elevated or lowered.

2. A hay-rake, comprising a tongue and seat-carrying frame, a transverse bar equipped with rake-teeth and pivoted to said frame and adapted to turn about a horizontal axis to raise or lower the teeth, bearings secured to said bar, horizontal axles journaled in said bearings and provided with depending crank-arms having outturned ends, means to prevent endwise movement of said axles in said bearings, wheels journaled on the outturned ends of said axles, inclined braces pivotally connecting said frame with the outturned ends of said crank-arms, and means for rotating said teeth-carrying bar and for securing it in position with its teeth elevated or lowered.

In testimony whereof I affix my signature in the presence of two witnesses.

LUTHER BROWN.

Witnesses:
CHARLES CONARD,
HENRY F. KLASTERMEIR.